United States Patent [19]

Oshizawa et al.

[11] Patent Number: 4,541,380
[45] Date of Patent: Sep. 17, 1985

[54] ELECTRONICALLY CONTROLLED FUEL INJECTION APPARATUS

[75] Inventors: Hidekazu Oshizawa, Kumagaya; Kyoichi Fujimori, Higashimatsuyama, both of Japan

[73] Assignee: Diesel Kiki Co., Ltd., Tokyo, Japan

[21] Appl. No.: 295,874

[22] Filed: Aug. 24, 1981

[30] Foreign Application Priority Data

Sep. 5, 1980 [JP] Japan .............................. 55-125654[U]
Sep. 5, 1980 [JP] Japan .............................. 55-125655[U]

[51] Int. Cl.[4] ............................................. F02M 39/00
[52] U.S. Cl. ..................................... 123/357; 123/479; 123/198 D
[58] Field of Search ............ 123/198 D, 198 DB, 357, 123/494, 479, 358-359

[56] References Cited

U.S. PATENT DOCUMENTS

| 3,699,935 | 10/1972 | Adler | 123/359 |
| 3,796,197 | 3/1974 | Locher | 123/501 |
| 3,834,361 | 9/1974 | Keely | 123/479 |
| 4,064,855 | 12/1977 | Johnson | 123/467 |

Primary Examiner—Carl Stuart Miller
Attorney, Agent, or Firm—James C. Wray

[57] ABSTRACT

In an electronically controlled fuel injection apparatus which is controlled in accordance with the signal from a sensor for providing a signal concerning the operational condition of the associated engine, there are provided a generator for generating a stand-by signal by which the apparatus is able to continue the control operation thereof without the normal output signal from the sensor and a switching circuit for applying the stand-by signal instead of the signal from the sensor to a control section for electronically controlling the apparatus in response to detecting the occurrence of trouble in the sensor.

5 Claims, 13 Drawing Figures

ELECTRONICALLY CONTROLLED FUEL INJECTION APPARATUS

This invention relates to an electronically controlled fuel injection apparatus for an internal combustion engine, and more particularly to an electronically controlled fuel injection apparatus which is capable of maintaining the operation of the fuel injection apparatus even when a sensor provided for carrying out electrical control of the fuel injection apparatus becomes inoperative.

A conventional electronically controlled fuel injection apparatus is comprised of an engine speed sensor coupled to the crankshaft of the engine and a circuit for computing the optimum amount of fuel to be injected, which circuit is input at least with an engine speed signal from the engine speed sensor and computes the optimum amount of fuel injection on the basis of the engine speed detected. A fuel adjusting member is controlled by an electrical actuator according to the result of the computation, and, thus, the amount of fuel injected is electronically controlled. In the electronically controlled fuel injection device of this type, when the engine speed sensor is disabled making engine speed detection impossible, control cannot be effected and the engine stops. This situation is very serious, because it means that the vehicle cannot move.

A conventional fuel injection apparatus with electronically controlled timing of the beginning of fuel injection computes a target injection advance of fuel injection on the basis of various signals indicating the operational conditions of the engine and detects the actual injection advance of fuel injection on the basis of the top dead center timing of the crank and the actual timing of the beginning of fuel injection, and a timer is controlled so as to make the difference between the target injection advance and the actual injection advance zero. Thus, if the sensor for detecting these timings malfunctions, it becomes impossible to control the injection timing as required. As a result, various troubles such as overheating of the engine, generation of black smoke in the exhaust gas, etc. may occur.

As described above, in these conventional electronically controlled fuel injection apparatuses which are controlled by signals from sensors, possible troubles with the sensors will cause fatal operational trouble in the engine.

It is, therefore, an object of the present invention to provide an improved electronically controlled fuel injection apparatus which is capable of obviating the above-mentioned defects of the conventional electronically controlled fuel injection apparatuses.

It is another object of the present invention to provide an electronically controlled fuel injection apparatus which is capable of continuing operation with a desired control performance, even when a sensor provided for carrying out electrical control goes out of order.

It is a still another object of the present invention to provide an electronically controlled fuel injection apparatus which is capable of effecting control of the amount of fuel injected, even when an engine speed sensor for detecting the speed of the engine used with the fuel injection device becomes inoperative.

It is still another object of the present invention to provide an electronically controlled fuel injection apparatus which is capable of controlling the advance angle of injection with a desired operational performance, even when a sensor for electrically controlling a timer malfunctions.

In accordance with the present invention, there is provided an electronically controlled fuel injection apparatus which comprises at least one sensor for detecting the operational conditions of an internal combustion engine; a means for adjusting a given parameter concerning fuel injected into the internal combustion engine, such as the amount of fuel injected, the injection advance or the like; a control section for electrically controlling the adjusting means according to the information detected by said sensor so as to make the value of the parameter optimum; a detector for detecting trouble with the sensor; a means for generating a standby signal for continuing the control of the fuel injection apparatus without a normal output signal from said sensor; and a switching means for inputting said standby signal to said control section in response to the trouble detection by said detector. For example, in an electronically controlled fuel injection apparatus which is provided with a valve-opening timing sensor for detecting the valve-opening timing of a fuel injection-valve and capable of controlling the injection advance according to the information from the valve-opening timing sensor, a stand-by signal indicating the engine speed can be generated on the basis of the output from the valve-opening timing sensor when the engine speed sensor in the section for controlling an amount of fuel injection becomes inoperative. Therefore, the operation of the electronically controlled fuel injection apparatus can be continued without any trouble by using the stand-by signal instead of the output signal from the engine speed sensor, in response to the detection of trouble in the engine speed sensor. When a sensor necessary for controlling the injection advance of fuel malfunctions, a stand-by signal for controlling the injection advance angle of injection is generated using a signal indicating the amount of fuel injected, to control the injection advance of fuel. In these cases, for the operation by the stand-by signals, it is preferred to confine the values of the parameters, i.e., objects of the control, within predetermined ranges.

As mentioned above, according to the present invention, in the case where trouble occurs in the engine speed detecting section and normal engine speed information cannot be obtained, the amount of fuel injected can be controlled based on the engine speed information from another engine speed signal source, upon detection of the trouble. Thus, extraordinary operation of the fuel injection apparatus can be effected without substantial remodelling of the apparatus and the reliability of the apparatus can be greatly improved without additional cost.

Further, the control of the timing of the beginning of fuel injection can be continued using the stand-by control signal from the stand-by control signal generating means, even when the sensor for carrying out the electrical control of the injection timing malfunctions, so that there can be provided a fuel injection apparatus of high reliability which is capable of preventing overheating of the engine and generation of black smoke.

Further objects and advantages of the present invention will be apparent from the following detailed description to be read in conjunction with the accompanying drawings in which.

Figure 1:
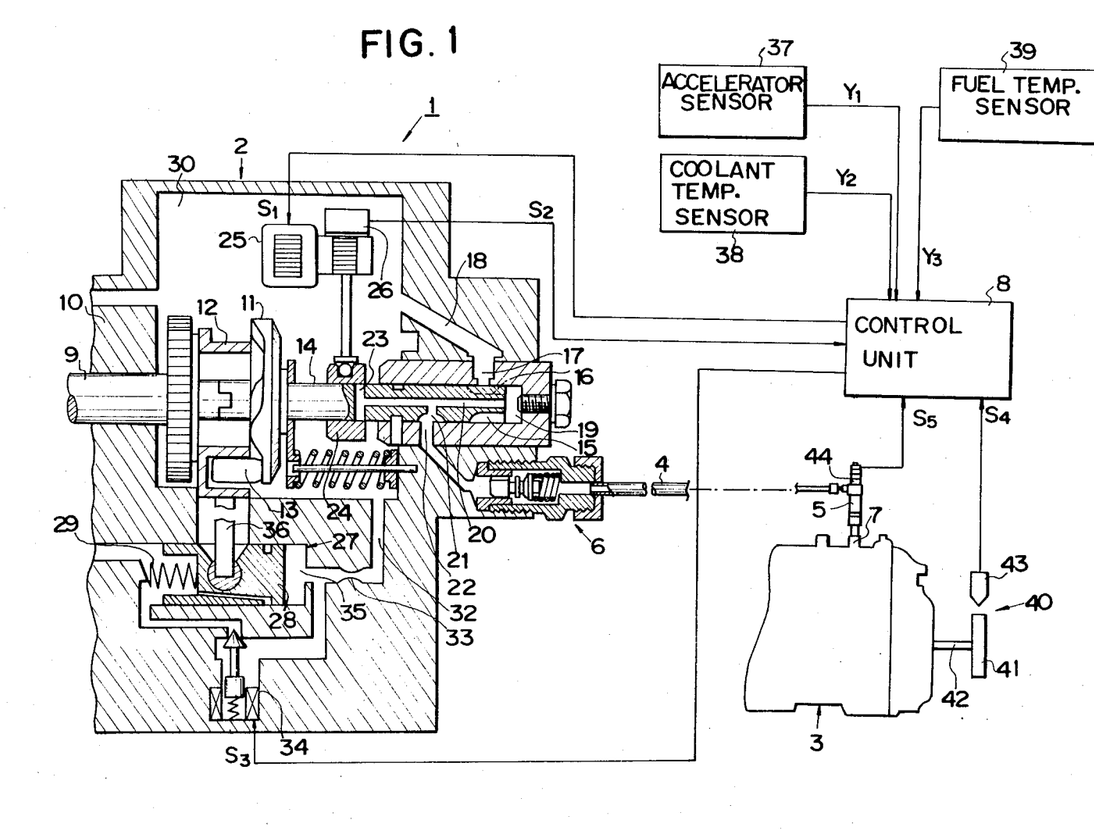
FIG. 1 is a schematic block diagram of one embodiment of an electronically controlled fuel injection apparatus of the present invention including a partly sectional view of a fuel injection pump.

FIG. 1 illustrates a schematic block diagram of one embodiment of an electronically controlled fuel injection apparatus of the present invention including a partly sectional view of a fuel injection pump. An electronically controlled fuel injection apparatus 1 has a distribution type fuel injection pump 2 adapted to electronically control the amount of fuel injected and the injection advance (or the timing of the beginning of fuel injection), and the fuel injection pump 2 injects the fuel from a fuel tank (not shown) into the cylinders of a diesel engine 3 through injection pipes and injection nozzles. In FIG. 1, although only one injection pipe 4 and associated injection nozzle 5 are illustrated between one delivery valve 6 of the injection pump 2 and one cylinder 7 of the engine 3, the fuel is also injected into the other cylinders of the engine 3 from associated delivery valves (not shown) of the fuel injection pump 2 in a similar manner. The electronically controlled fuel injection apparatus 1 comprises a control unit 8 for electronically controlling the amount of fuel injected from the fuel injection pump 2 and the injection advance of the fuel injected therefrom The fuel injection pump 2 includes a drive shaft 9 supported by a housing 10 and driven by the engine 3, a cam disc 11 rotated by the drive shaft 9, and a roller holder 12 having a plurality of rollers (only one roller 13 is seen in FIG. 1). The cam disc 11 causes a plunger 14 to reciprocate and rotate simultaneously, in accordance with the rotation of the drive shaft 9. The plunger 14 has, at one end portion thereof, intake slits provided as many as the number of cylinders of the engine 3. (Only two intake slits 15, 16 are shown in the figure.) When an intake slit comes opposite an intake port 17 during the back stroke of the plunger 14, pressurized fuel passes through a passage 18 into a high-pressure chamber 19 and a passage 20 formed in the plunger 14. Compression of the pressurized fuel introduced into the chamber 19 is begun when the intake port 17 is closed by the outside wall of the plunger 14 due to the reciprocating motion of the plunger 14. When a distributor slit 20 communicating with the passage 20 comes opposite an outlet passage 22 after further forward motion of the plunger 14, the compressed high-pressure fuel in the high pressure chamber 19 passes through the delivery valve 6 and is supplied into the combustion chamber of the engine 3 through the injection pipe 4 and the injection nozzle 5 mounted on the engine 3. When the plunger 14 is further advanced by the cam disc 11, a cut-off port 23 communicating with the passage 20 is disengaged from a control sleeve 24 to terminate the fuel injecting operation. The amount of fuel injected is adjusted by the relative position between the control sleeve 24 and the plunger 14. To permit the adjustment, the control sleeve 24 is coupled to a solenoid actuator 25. The electric power to be supplied to the solenoid actuator 25 is controlled by the control unit 8 so as to change the position of the control sleeve 24 for freely adjusting the amount of fuel injected. The control unit 8 includes a circuit for controlling the driving of the solenoid actuator 25, which is driven by a driving signal $S_1$ from the control unit 8. On the actuator 35, there is provided a position sensor 26 for detecting the position of the control sleeve 24 and a sleeve position signal $S_2$ produced from the position sensor 26 is input into the control unit 8.

The fuel injection pump 2 has an electrically controlled timer 27 for adjusting the injection advance of fuel injected from the injection pump 2. The timer 27 has a piston 28 one end face of which is urged by a compression spring 29. Although the axis of the timer 27 is shown here as being parallel with that of drive shaft 9 for convenience in explaining the apparatus, in the actual apparatus, the timer 27 is located in such a way that the axis of piston 28 and drive shaft 9 are at right angles to each other. Pressure within a housing chamber 30 is applied to the other end face of the piston 28 through a passage 32 and a construction 33. A pressure regulating solenoid valve 34 is provided for regulating the pressure applied to piston 28 so as to locate the piston 28 at a desired position. The pressure regulating solenoid valve 34 is controlled so as to set the pressure within a cylinder chamber 35 at a desired value. Piston 28 is articulatedly connected to one end of a rod 36 whose opposite end is connected to the roller holder 12, so that the angular position of roller holder 12 may be varied according to the position of piston 28 thereby to control the injection advance of fuel by a driving signal $S_3$ supplied from the control unit 8.

Figure 2:
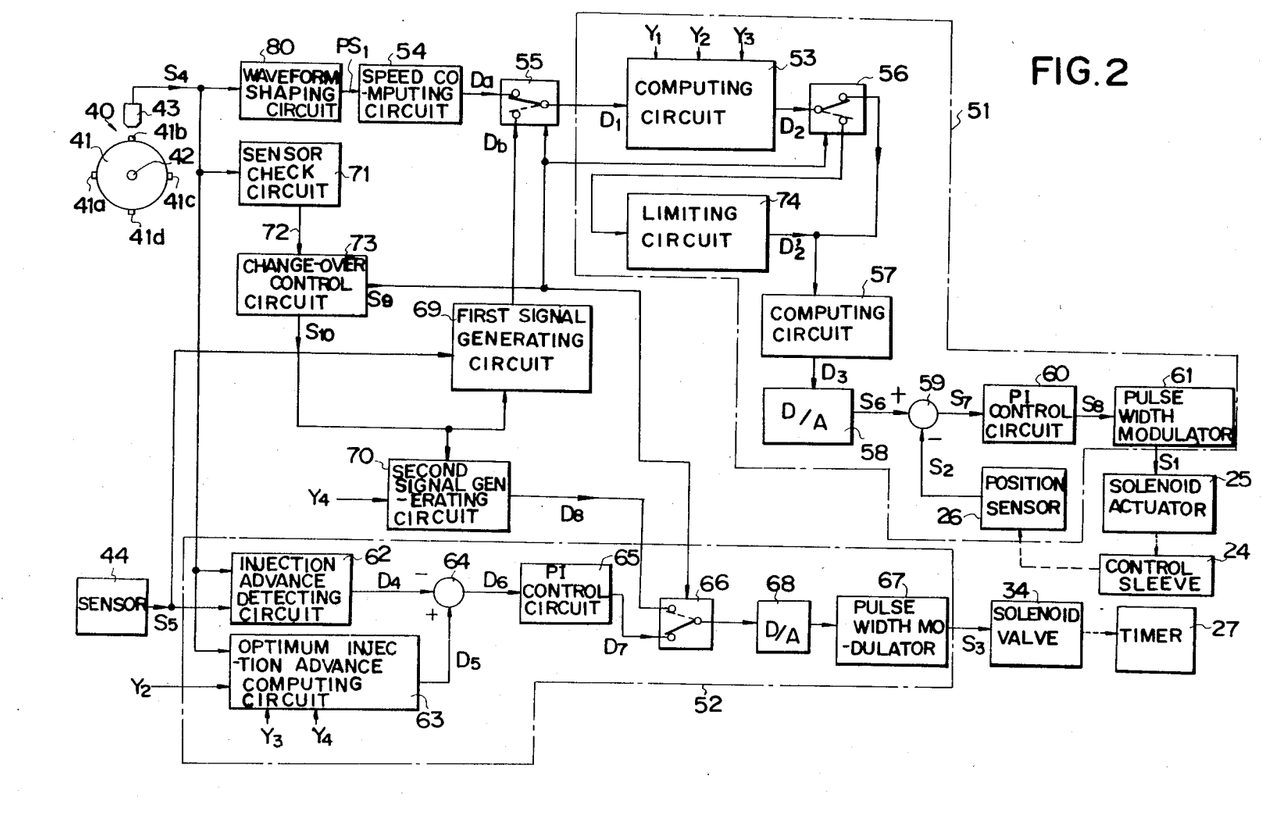
FIG. 2 illustrates a block diagram of the control system of the fuel injection apparatus shown in FIG. 1.

To produce the driving signals $S_1$ and $S_3$ in accordance with the condition of the engine operation, there are provided an accelerator sensor 37 for generating data $Y_1$ indicative of the position of an accelerator pedal (not shown), a coolant temperature sensor 38 for generating data $Y_2$ indicative of the temperature of the coolant of the engine 3 and a fuel temperature sensor 39 for generating data $Y_3$ indicative of the temperature of the fuel. These data $Y_1$ to $Y_3$ are produced in digital form. Moreover, for detecting the engine speed and the top dead center timing of the engine 3, there is provided a sensor 40 which is composed of a gear 41 secured to a crankshaft 42 of the engine 3 and an electromagnetic pick-up coil 43. As shown in FIG. 2, four cogs $41_a$ to $41_d$ are formed on the periphery of the gear 41 and an a.c. output signal is produced as the signal $S_4$ from the electromagnetic pick-up coil 43 as these cogs approach the coil 43 and then depart from the coil 43 in sequence with the rotation of the engine 3. The signal $S_4$ changes in frequency in accordance with the engine speed. To detect the top dead center timing of the engine by the use of the sensor 40, the gear 41 is secured to the crankshaft 42 in such a way that one of the cogs faces the pick-up coil 43 each time one of the pistons of the engine 3 reaches top dead center.

The injection nozzle 5 is provided with a sensor 44 for producing a timing signal $S_5$ which indicates the timing of the opening of the valve of the injection nozzle 5. The sensor 44 is composed of an induction coil and a core which is displaced relative to the induction coil in accordance with the displacement of a needle valve in the injection nozzle 5. Since the structure of the injection nozzle having such a detector is known in the prior art, a detailed description is omitted. The timing signal $S_5$ produced by the sensor 44 is applied to the control unit 8, in which the signal $S_1$ for driving the solenoid actuator 25 and the signal $S_3$ for driving the solenoid valve 34 are generated, as described in more detail hereinafter.

FIG. 2 is a block diagram of a control system for the fuel injection apparatus shown in FIG. 1. The control system has an injection amount control section 51 and an injection timing control section 52. The injection amount control section 51 is a circuit for generating the driving signal $S_1$ for driving the actuator 25 and the control sleeve 24 is positioned in such a way that the optimum amount of fuel can be injected into the engine in accordance with the conditions of the engine operation. The injection amount control section 51 includes a computing circuit 53 for computing the optimum amount of fuel injection to which various information concerning the conditions of the engine operation is applied in the form of electric data signals. As is well known, the optimum amount of fuel injection depends upon the conditions of the engine operation at each instant, and the relationship between the optimum amount of fuel injection and the operating conditions of the engine, such as engine speed, coolant temperature, the degree of the depression of the accelerator pedal or the like, can usually be determined experimentally. In this embodiment, data $Y_1$, $Y_2$ and $Y_3$ and an engine speed data $D_1$ are applied thereto in the form of digital data, and the optimum amount of fuel injection at that time is computed in the computing circuit 53 on the basis of these input data. The computing circuit 53 includes a memory in which the data concerning the above relationship obtained in the way mentioned above is stored and the optimum amount of fuel injection can be selected in accordance with the set of input digital data mentioned above. There is known an electronic circuit which includes a memory for storing the resulting data determined by the input data in advance and which can output the stored data corresponding to the input data from the memory when the input data is applied to the electronic circuit. It is one of the prior art techniques to store the resulting data in advance at the address of the memory designated by the input data corresponding to the resulting data and to obtain the resulting data by applying the input data to the memory as address data. (For example, U.S. Pat. No. 3,689,753) Then, optimum injection amount data $D_2$ indicating the computed result in the circuit 53 is output in a digital form.

For supplying the engine speed data $D_1$ to the control section 51, there is provided a speed computing circuit 54 for computing the engine speed at each instant on the basis of a square wave pulse signal $PS_1$ which is produced in a waveform shaping circuit 80 as will be described hereinafter and a computed engine speed data $D_a$ indicating the engine speed at each instant in the digital form is produced from the speed computing circuit 54. The data $D_a$ is applied to a change-over switch 55. As will be described in more detail hereinafter, when the sensor 40 operates normally, the change-over switch 55 selects the computed engine speed data $D_a$ as the engine speed data $D_1$ and applies the data $D_a$ to the computing circuit 53. At the same time, a change-over switch 56 provided at output side of the computing circuit 53 is switched over so as to directly apply the data $D_2$ to a computing circuit 57 for computing the position of the control sleeve 24.

The circuit 27 computes the required position of the control sleeve 24 for obtaining the optimum amount of fuel injection indicated by the optimum injection amount data $D_2$. The circuit 57 can also use a ROM in a similar arrangement to the computing circuit 53. The computed result is output as sleeve position data $D_3$, and the data $D_3$ is converted into corresponding analog data by a digital-analoge (D/A) converter 58. The analog data produced from the D/A converter 58 is applied as a target signal $S_6$ indicating the optimum position for the control sleeve 24 at this time to an adder 59 by which the target signal $S_6$ is added to the sleeve position signal $S_2$ from the sensor 26 with the polarity shown in FIG. 2. As a result, the adder 59 produces an error signal $S_7$ indicating the difference between the target sleeve position indicated by the target signal $S_6$ and the actual sleeve position shown by the sleeve position signal $S_2$. The error signal $S_7$ is processed in a PI control circuit 60 so that the signal $S_7$ is converted into a signal $S_8$ adapted to carry out an proportion-integration control operation. After this, the signal $S_8$ is applied to a pulse width modulator 61. The pulse width modulator 61 produces a pulse signal for driving, the duty ratio of which varies in accordance with the magnitude of the signal $S_8$, and the pulse signal for driving is applied as the driving signal $S_1$ to the solenoid actuator 25. The change of the position of the control sleeve 24 due to the operation of the solenoid actuator 25 is fed back to the adder 59 as a change in the sleeve position signal $S_2$, and the control sleeve 24 is positioned in such a way that the difference shown by the error signal $S_7$ becomes zero; that is, the actual sleeve position is made coincident with the target sleeve position.

On the other hand, the injection timing control section 52 is the circuit for controlling the timer 27 so as to obtain the optimum injection advance in accordance with the conditions of operation of the engine 3 and comprises an injection advance detecting circuit 62 which produces actual injection advance data $D_4$ indicative of the actual injection advance in the fuel injecting operation and an optimum injection advance computing circuit 63 for producing optimum injection advance data $D_5$ indicating the optimum injection advance at each instant on the basis of various information concerning the condition of the engine operation which are applied to the circuit 63. The signal $S_4$ from the sensor 40 is applied as a signal indicative of the top dead center timing of the engine to the circuit 62. The timing signal $S_5$ from the sensor 44 is also applied thereto. The timing signal $S_5$ is a signal indicative of the timing of the beginning of fuel injection. In the injection advance detecting circuit 62, the actual injection advance is detected on the basis of the difference between the timing $T_1$ indicated by the timing signal $S_5$ and the top dead center timing $T_2$ indicated by the signal $S_4$ and the actual injection advance data $D_4$ is produced in digital form.

Figure 3:
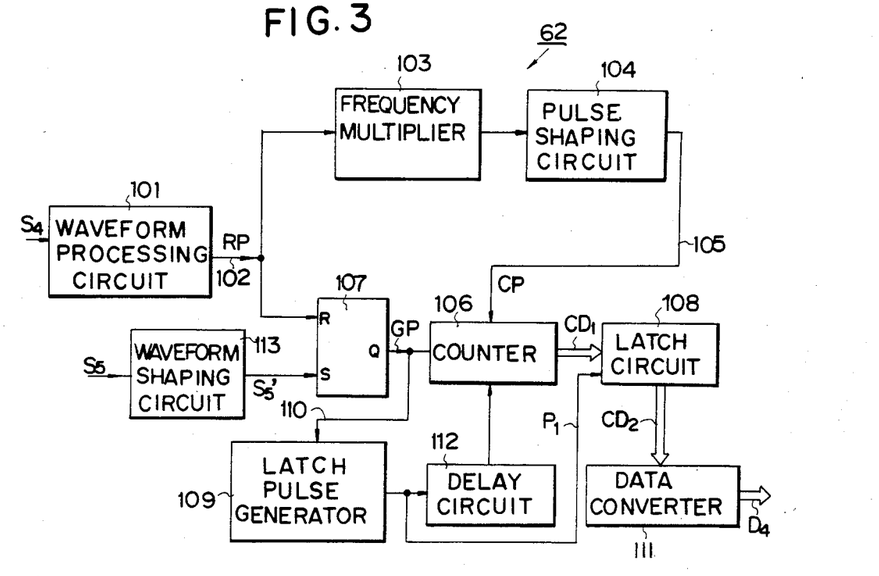
FIG. 3 illustrates a detailed block diagram of the injection advance detecting circuit of FIG. 2.

In FIG. 3, a detailed block diagram of the injection advance detecting circuit 62 is illustrated. The signal $S_4$ from the sensor 40 is put into a waveform processing circuit 101 to generate a square wave signal corresponding to the signal $S_4$. The pulse train RP from the waveform processing circuit 101 is sent through an output line 102 to a frequency multiplier 103 which is a phase locked loop (PLL) circuit. As a result, the frequency of the signal output from the waveform processing circuit 101 is multiplied and the resulting multiplied signal can be derived from the frequency multiplier 103. The signal output from the frequency multiplier 103 is applied to a pulse shaping circuit 104 to shape the waveform thereof and the resulting pulse signal CP from the pulse shaping circuit 104 is applied through a line 105 to a counter 106 as count pulses.

Figure 4:
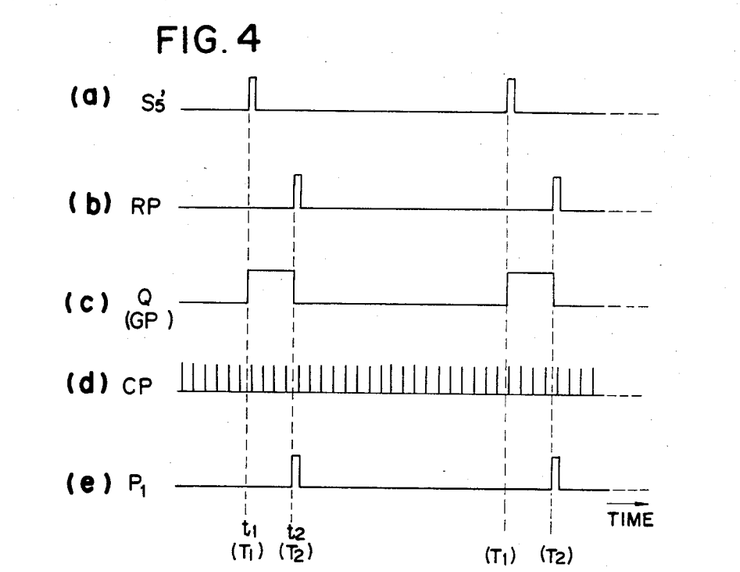
FIGS. 4(a) to 4(e) illustrate timing charts for the signals in FIG. 3.

In order to count the number of count pulses produced during the period from the time the injection nozzle 5 is opened to the time the associated crank reaches top dead center, there is provided an R-S flip-flop 107 which produces count gate pulses GP from its Q output terminal for controlling the counting operation of the counter 106 on the basis of a timing signal $S_5'$ produced by shaping the signal $S_5$ in a waveform shaping circuit 113 and reference timing pulses RP produced by the waveform processing circuit 101. As described above, since the relative positional relationship between the gear 41 and the coil 43 is such that one of the cogs of the gear 41 is opposite the coil 43 each time the associated crank is at top dead center, the coil 43 produces a signal indicative of the time the crank is at top dead center and this signal is applied to the waveform processing circuit 101 to produce the reference timing pulses indicative of the top dead center timing. As the timing signal $S_5'$ is applied to the SET terminal S of the R-S flip-flop 107 and the reference timing pulses from the waveform processing circuit 102 are applied to the RESET terminal R of the R-S flip-flop 107, as illustrated in FIGS. 4(a) to 4(c), the Q output of the R-S flip-flop 107 which is used as a count gate pulse GP assumes a high level for the period from the time when the timing signal $S_5'$ is produced at the time of $t_1$ (timing $T_1$) to the time when the reference timing pulse RP is produced at the time of $t_2$ (timing $T_2$). The counter 106 is arranged so as to be operative only during the high level state of the count gate pulse GP so that the number of pulses applied to the counter for the duration from $t_1$ to $t_2$ can be counted.

The count registered by the counter 106 is output as count data $CD_1$ and the count data $CD_1$ are applied to a latch circuit 108 also receiving latch pulses $P_1$, which are generated in a latch pulse genarator 109 on the basis of the count gate pulses derived from the R-S flip-flop 107 through a line 110 (shown in FIG. 4(e)). Since the time when the latch pulse $P_1$ is generated is just after the counting operation of the counter 106 is inhibited by the count gate pulse FP, the resulting count data $CD_1$, which are obtained by counting the pulses produced over a time determined by each count gate pulse, is stored in the latch circuit 108 by the application of the latch pulse, and then the latched data $CD_2$ is applied to a data converter 111 while the next data from the counter 106 is being latched in the latch circuit 108. The latched data $CD_2$ is converted into angle data indicative of the injection advance at that instant in the data converter 111. The resulting data indicative of the injection advance in angle is derived as the actual injection advance data $D_4$.

The latch pulses from the latch pulse generator 109 are also applied through a delay circuit 112 to the counter 106 as reset pulses. Therefore, the counter 106 is reset by the reset pulses after every latching of the data $CD_1$ in the latch circuit 108 so that the counter 106 can be ready to carry out the next counting operation.

Returning to FIG. 2, the data $Y_2$ and $Y_3$, the signal $S_4$ and injection amount data $Y_4$ indicating the actual amount of fuel injected in digital form are applied to the circuit 63 to compute and produce optimum injection advance data $D_5$ in the digital form on the basis of these input data and the signal. The circuit 63 can also be arranged similarly to the circuit 53. The data $D_5$ is input to an adder 64 to add the data $D_5$ to the actual injection advance data $D_4$ with the polarities shown in FIG. 2. As a result, an error data $D_6$, indicating the difference between the actual injection advance and the computed optimum injection advance, is produced. The error data $D_6$ is applied to a PI control circuit 65 to be converted into data adapted to carry out a proportion-integration control operation and the output data $D_7$ from the circuit 65 is applied to a change-over switch 66.

The output data $D_7$ is applied as a timer control signal to a pulse width modulation 67 through the switch 66 and a D/A converter 68. The pulse width modulator 67 produces a pulse signal as the driving signal $S_3$. The duty ratio of the signal $S_3$ varies in accordance with the level of the signal from the D/A converter 68 and the driving signal $S_3$ is applied to the solenoid valve 34 used for controlling the timer 27. The change of the actual injection advance caused by the operation of the timer 27 is fed back as a change in the actual injection advance data $D_4$ to the adder 64, and then, the timer 27 is controlled in such a way that actual injection advance is made coincident with the optimum injection advance.

In order to assure continued normal operation of the injection amount control section 51 even if the operation of the sensor 40 should be impaired for some reason so that the information concerning the engine speed cannot be received from the sensor 40, there is provided a first signal generating circuit 69 to which the timing signal $S_5$ from the sensor 44 is applied as information concerning the engine speed. The circuit 69 produces stand-by engine speed data $D_b$ on the basis of the timing signal $S_5$ to make up for the lack of the data $D_a$. The stand-by engine speed data $D_b$ is applied to the change-over switch 55, and one of the data $D_a$ and $D_b$ is selected by the operation of the change-over switch 55 to deliver it as the engine speed data $D_1$.

Figure 5:
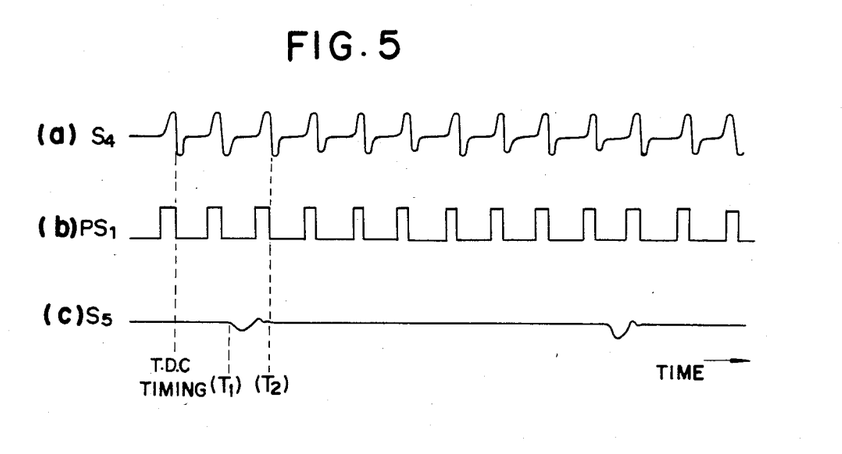
FIGS. 5(a) to 5(c) illustrate waveforms of the signals in the circuit of FIG. 2.

The computed engine speed data $D_a$ and the stand-by engine speed data $D_b$ will be described in conjunction with FIG. 5.

The computed engine speed data $D_a$ is computed in the speed computing circuit 54 on the basis of the signal $S_4$ and has the waveform is shown in FIG. 5(a). As will be understood from FIG. 5(a), the signal $S_4$ is composed of a plurality of pairs of positive and negative pulses, one pair being produced each time a cog approaches and then departs from the coil 43. The timing of the zero pulse level between the positive pulse and the negative pulse in each pair of pulses is the same as the top dead center timing. In the waveform shaping circuit 80, the signal $S_4$ is rectified and then is shaped in waveform to form a square wave pulse signal $PS_1$ as illustrated in FIG. 5(b). The speed computing circuit 54 computes the engine speed by measuring the period or the frequency of the pulse signal $PS_1$ and produces the measured result in digital form. On the other hand, in this embodiment, the timing signal $S_5$ is a signal having a period of just eight times as long as that of the signal $S_4$ as shown in FIG. 5(c). In the waveform of the signal $S_5$, each point at which the signal level begins to change to the negative direction designates the timing of the beginning of fuel injection. In the first signal generating circuit 69, the timing signal $S_5$ is also rectified and shaped in waveform in a similar way to the processing for signal $S_4$ and the engine speed is computed on the basis of the period or the frequency of the processed signal to produce the computed result in digital form as the data $D_b$.

As described in more detail hereinafter, the change-over switch 55 is switched over in such a way that the computed speed data $D_a$ is selected as engine speed data $D_1$ when the sensor 40 operates normally and the stand-by speed data $D_b$ is selected as the engine speed data $D_1$ when trouble occurs in the sensor 40.

When trouble occurs in the sensor 40, the supplying of the signal $S_4$ to the fuel injection timing control section 52 is stopped. As described above, since the actual injection advance is computed in the circuit 62 on the basis of the signal $S_4$ and $S_5$, the injection timing control section 52 is also rendered inoperative when signal $S_4$ cannot be received.

In order to assure continued operation of the injection timing control section 52 even when trouble occurs in the sensor 40, there is provided a second signal generating circuit 70. The second signal generating circuit 70 is a circuit for generating stand-by control data $D_8$ on the basis of the injection amount data $Y_4$ and the data $D_8$ is used to control the pulse width modulator 67 so as to be able to obtain an injection advance which is approximately coincident with the optimum injection advance which would be obtained by the controlling operation by the data $D_7$ if the signal $S_4$ were available. The data $D_8$ is applied to the change-over switch 66. Since the data $D_8$ is selected by the change-over switch when the trouble occurs in the sensor 40, the stand-by control data $D_8$ is applied to the pulse width modulator 67 via the D/A converter 68 in place of the data $D_7$.

In order to switch over the switches 55 and 66 in response to the occurrence of trouble in the sensor 40, there is provided a sensor check circuit 71. The signal $S_4$ is applied to the sensor check circuit 71 and the condition of the signal $S_4$ is monitored by the circuit 71. When the occurrence of trouble in the sensor 40 is detected by the sensor check circuit 71, the output at the output line 72 of the circuit 71 becomes low in level. A change-over control circuit 73 then produces a change-over signal $S_9$ and an inhibit signal $S_{10}$ in response to the level change in the output line 72. The change-over signal $S_9$ is applied to the change-over switches 55, 56 and 66. These switches are changed-over as shown by solid lines when the level of the signal $S_9$ is low due to the high level of output at the line 72 and are changed-over as shown by dotted lines when the level of the signal $S_9$ is high due to the low level of output at line 72. The inhibit signal $S_{10}$ is a signal for rendering the first and the second signal generating circuits 69 and 70 operative only when trouble occurs in the sensor 40 and for rendering the first and the second signal generating circuits 69 and 70 inoperative when the sensor 40 operates in normal condition.

Figure 6:
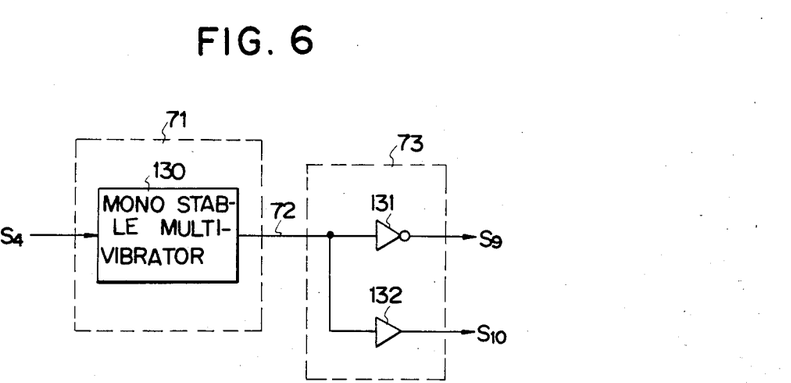
FIG. 6 illustrates a detailed circuit structure of the sensor check circuit and the change-over control circuit in FIG. 2.

In FIG. 6, there is shown a more detailed block diagram of the sensor check circuit 71 and the change-over control circuit 73. The sensor check circuit 71 is composed of a monostable multivibrator 130 to which the signal $S_4$ shown in FIG. 5(a) is applied as trigger pulses so that the monostable multivibrator 130 is triggered each time one of the pulses constituting the signal $S_4$ swings positive. When triggered, the signal level of the output line 72 of the monostable multivibrator 130 becomes high for a predetermined time $T_0$ after triggering operation. This level inverting time $T_0$ depends upon the time constant of the monostable multivibrator 130, and in this case, the time $T_0$ is determined so as to be longer than the time interval between the pulses of the signal $S_4$ at minimum engine speed. Therefore, the signal level of the line 72 is kept at a high level when the sensor 40 operates under the normal condition. However, if any trouble occurs in the sensor 40 so that production of the signal $S_4$ is stopped, the multivibrator 130 does not maintain the output at line 72 at high level; that is, the output at the line 72 become low. Consequently, it is possible to monitor whether or not the sensor 40 is normally operated. The change-over control circuit 73 has an inverter 131 for inverting the signal level of the line 72 to produce the signal $S_9$ and a buffer circuit 132 from which the signal $S_{10}$ is derived. In this embodiment, the circuits 69 and 70 are inhibited when the level of the signal $S_{10}$ is high.

The operation of the circuit shown in FIG. 2 when trouble occurs in the sensor 40 will be described.

When the trouble occurs in the sensor 40, the first signal generating circuit 69 is rendered operative and the stand-by speed data $D_b$ is supplied as engine speed data $D_1$ to the injection amount control section 51. Therefore, the operation for controlling the amount of fuel injected can be carried out without any trouble even when the computed engine speed data $D_a$ cannot be derived from the sensor 40. At the same time, the change-over switch 56 is also switched over as shown by the dotted line, so that the optimum injection amount data $D_2$ is applied to the computing circuit 57 through a limiting circuit 74. The limiting circuit 74 is a circuit for limiting the value of the data $D_2$ below a predetermined upper limit when the value of the data $D_2$ exceeds the upper limit and for preventing the value of the data $D_2$ from falling below a predetermined lower limit when the value of the data $D_2$ is below the lower limit. Therefore, the digital data $D_2'$ derived from the limiting circuit 72 is always within a range between the predetermined upper and lower limits. As a result, extreme increases in the amount of fuel injected can be prevented when the control operation for adjusting the amount of fuel injected based on the stand-by engine speed data $D_b$ involves a considerable amount of error. Also the control operation can be effectively carried out even if the timing signal $S_5$ is not generated from the sensor 44 due to non-injection of fuel.

On the other hand, in the injection timing control section 52, since the change-over switch 66 is switched over as shown by dotted line in FIG. 2 when trouble occurs in the sensor 40, it follows that the timer 27 is controlled in accordance with the stand-by control data $D_8$. Therefore, even in the absence of a signal indicating the top dead center timing of the engine, it is possible to continue operating of the engine with an injection advance which is approximately coincident with the optimum injection advance.

Although only injection amount data $Y_4$ is applied to the second signal generating circuit 70 in the above mentioned embodiment, other signals necessary for determining the optimum injection advance may also be applied thereto.

Furthermore, the second signal generating circuit 70 may be arranged so as to produce constant control data without the application of the signals indicating the condition of engine operation.

Figure 7:
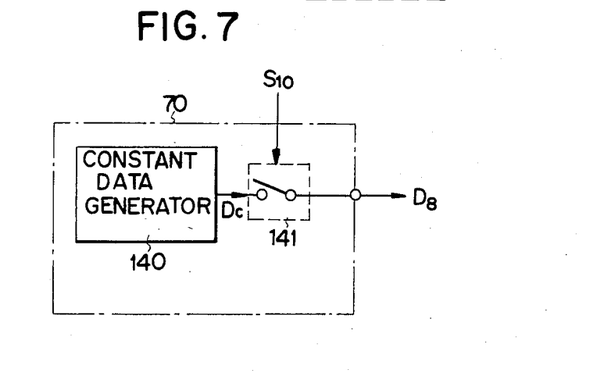
FIG. 7 illustrates a circuit of another embodiment of the second signal generating circuit of FIG. 2.

In FIG. 7, such an embodiment of the second signal generating circuit is illustrated. A circuit 70 has constant data generator 140 for generating constant control data $D_c$ for controlling the timer 27 and the data $D_c$ is derived as the data $D_8$ through a switch 141 which is closed only when the level of the signal $S_{10}$ is low. Therefore, in this case, the timing of the beginning of fuel injection is controlled by the data $D_c$ so as to maintain a predetermined timing irrespective of the condition of engine operation.

In the embodiment mentioned above, although the signal produced from the sensor 44 for detecting the timing of the beginning of injection of fuel is used in place of the signal from the sensor 40, the signal source for the stand-by speed signal can be obtained elsewhere if required. For example, in the apparatus which has a speed sensor for detecting the engine speed and a timing sensor for detecting the top dead center timing of the engine, the timing sensor may be used as the signal source for obtaining the information concerning the engine speed in place of the speed sensor.

Although the distribution type fuel injection pump is employed here as one example of the present invention, the present invention is also applicable to the electronically controlled type in-line pump system in a similar way as described above.

We claim:

1. An electronically controlled fuel injection apparatus for an internal combustion engine, comprising:
    a speed sensor for detecting a rotational speed for said engine;
    means for adjusting the injection advance angle of fuel injected into said engine;
    a control signal generator which include a computing means responsive to at least the output signal from said speed sensor for computing a target injection advance angle for the condition of the operation of said engine at each instant and generates a control signal for controlling said adjusting means so as to obtain the target injection advance angle on the basis of the computing result of the computing means;
    means for detecting the occurrence of trouble in said speed sensor;
    means for producing a stand-by control signal by which said fuel injection apparatus is able to continue the control operation of the injection advance angle without the normal output signal from said speed sensor;
    a switching means responsible to the resulting output from said detecting means for selectively applying the control signal to said adjusting means when the occurrence of trouble is not detected by said detecting means while the stand-by control signal to said adjusting means in place of the control signal when the occurrence of trouble is detected by said detecting means; and
    the speed sensor being arranged so as to generate top dead center timing pulses indicating the time a piston of said engine reaches its top dead center respectively.

2. The apparatus as claimed in claim 1 wherein said control signal generator has a means for generating a valve-opening signal indicative of the timing of the valve-opening of an injection nozzle, a first means for detecting an actual injection advance angle in response to the top dead center timing pulses and the valve-opening signal, and a second means for producing the control signal by comparing the output signal from the first means with the computing result of the computing means.

3. The apparatus as claimed in claim 1 wherein the stand-by control signal is produced in accordance with a signal indicative of the amount of fuel injected.

4. The apparatus as claimed in claim 1 wherein said means for detecting trouble includes a monostable multivibrator triggered by the top dead center timing pulses and the level inverting time of the output signal of the monostable multivibrator is set to be less than the generating period of the top dead center timing pulses at the minimum speed of said engine.

5. An electronically controlled fuel injection apparatus for an internal combustion engine comprising sensor means for detecting engine speed and top dead center timing and producing a corresponding electrical signal, sensor means for detecting the timing of the opening of a valve in an injection nozzle and producing a corresponding electrical signal, control means for receiving signals generated by the sensor means, the control means having a section for computing optimal injection amount and a section for computing fuel injection timing, and back-up signal generating means integrated in the control means, the back-up signal generating means having a sensor check circuit for detecting malfunction in the engine speed and top dead center timing sensor, a changeover control circuit associated with the sensor check circuit, first and second signal generating circuits providing substitute engine speed data, and changeover switches associated with each of the first and second signal generating circuits to feed the back-up signals into the two sections of the control unit.

* * * * *